April 13, 1937.  L. FIEDLER  2,076,813
JAR HOLDER
Filed Sept. 9, 1935
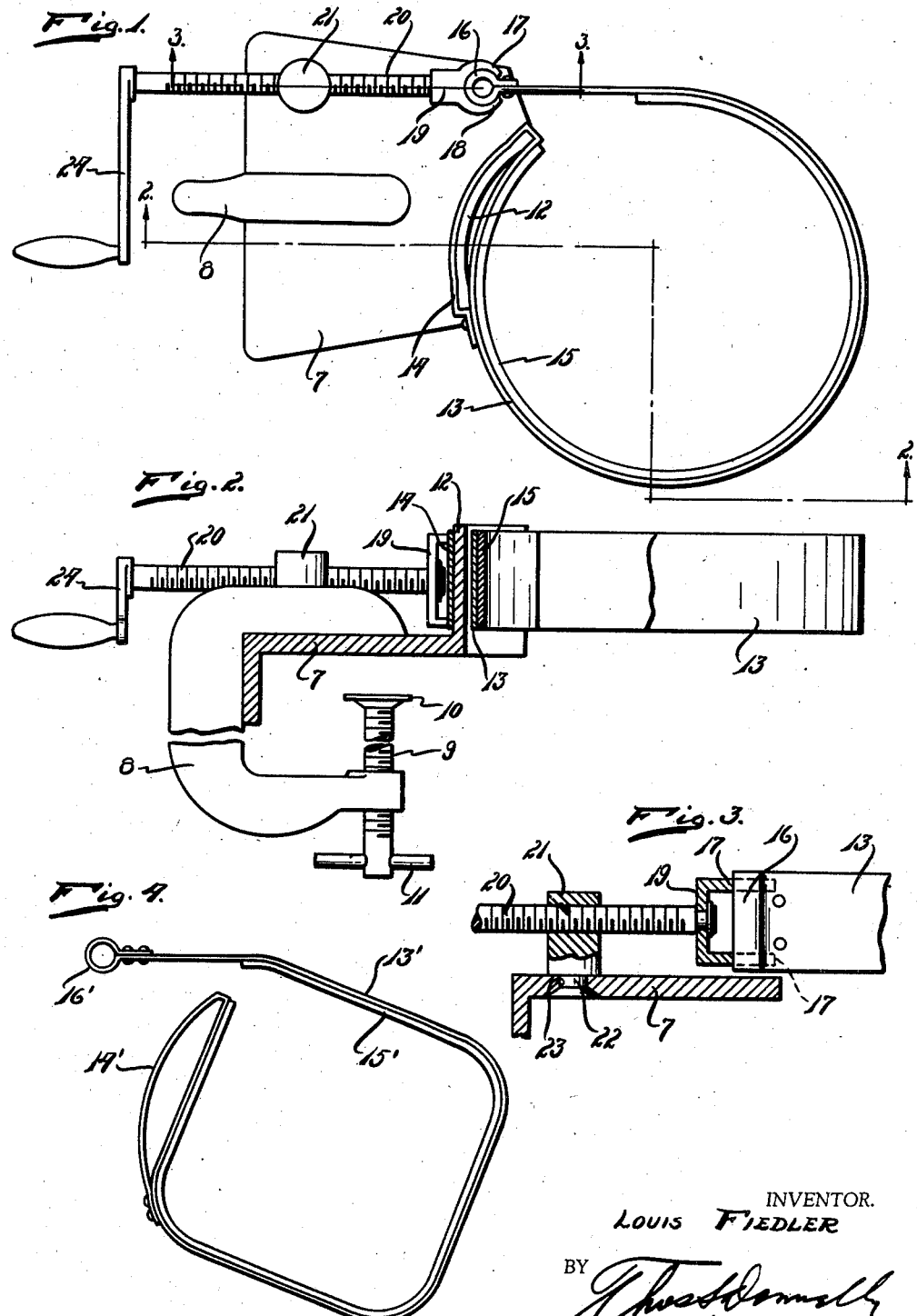
INVENTOR.
LOUIS FIEDLER
BY
ATTORNEY.

Patented Apr. 13, 1937

2,076,813

UNITED STATES PATENT OFFICE 2,076,813

JAR HOLDER

Louis Fiedler, Detroit, Mich.

Application September 9, 1935, Serial No. 39,771

1 Claim. (Cl. 81—3.2)

My invention relates to a new and useful improvement in a jar holder adapted for retaining a jar or similar receptacle stationary while the screw cap is being threaded thereon or removed therefrom.

It is an object of the present invention to provide a jar holder of this class which will be simple in structure, economical of manufacture, durable, highly efficient in use, light, compact and easily and quickly operated.

Another object of the invention is the provision of a jar holder of this class in which a gripping member may be removed therefrom and replaced thereon with a minimum amount of effort and in a minimum period of time.

Another object of the invention is the provision of a jar holder so arranged and constructed that when the clamping member is moved into clamping position, no additional means will be required for locking the same in clamping position.

Other objects will appear hereinafter.

The invention consists in the combination and arrangement of parts hereinafter described and claimed.

The invention will be best understood by a reference to the accompanying drawing, which forms a part of the specification, and in which, Fig. 1 is a top plan view of the invention.

Fig. 2 is a sectional view taken on line 2—2 of Fig. 1.

Fig. 3 is a fragmentary, sectional view taken on line 3—3 of Fig. 1.

Fig. 4 is a top plan view of a modified form of clamping band.

As shown in the drawing the invention comprises a plate 7 having the arm 8 projected outwardly therefrom and turned inwardly to lie thereunder and serve as a nut for the screw 9 which is threaded therethrough and which is provided on its upper end with the swivel foot 10 and on its lower end with the turning bar 11. This serves as a clamp whereby the device may be clamped on a suitable supporting body such as a table or the like. Formed, preferably integral with the plate 7, and projected upwardly therefrom is the arcuate post 12 which serves as an anchor for one end of a clamping band. This clamping band comprises the resilient metallic strip 13 which is doubled upon itself at one end to provide the eyelet-forming portion 14 into which the plate 12 may be inserted. Fixedly mounted on the inner surface of the strip 13 is a lining 15 of yieldable material such as felt, leather or the like. Thus, the clamping band, which comprises the strip 13 and the liner 15, is anchored at one end. At the oposite end the metallic strip 13 projects beyond the end of the lining 15 and is formed into an eyelet 16 which may be slipped into the space between the arcuate prongs 17 and 18 which are carried by the fitting 19. This fitting is swivelly mounted on the screw 20. The screw 20 is threaded through an opening formed in the post 21. This post 21 is provided with a central stud 22 projecting from its lower end which is extended through the opening 23 and offset therein so as to rivet the device on the plate 7. The post 21, however, is free for rotation on the plate 7. A crank handle 24 is fixedly mounted on the end of the screw 20. When a jar is placed within the space surrounded by the clamping band and the screw 20 rotated outwardly of the post 21, the jar will be securely clamped by the clamping band and held in position. When the threading outwardly of the screw 20 has reached the desired degree, the jar or other article clamped by the clamping band will remain in clamped position until a reversed threading of the screw is effected.

It is obvious that the clamping band may be very easily and quickly removed by lifting it upwardly, the eyelet 16 moving upwardly freely and the band disengaging from the post 12.

In Fig. 1 I have shown the clamping band formed substantially circular for engaging cylindrical jars and the like.

In Fig. 4 I have shown a modified form of the clamping band in which the metallic strip 13' and the lining 15' are bent into substantially square formation to accommodate a square jar. The doubled-over portion 14' of the strip 13' serves to seat over the post 12 in the manner shown for the circular form illustrated in Fig. 1.

It is obvious that the jar holder is possessed of a minimum number of parts and the economy of manufacture is believed also apparent.

While I have illustrated and described the preferred form of construction, I do not wish to limit myself to the precise details of structure shown, but desire to avail myself of such modifications and variations as may come within the scope of the appended claim.

Having thus described my invention, what I claim as new and desire to secure by Letters Patent is:

A jar holder of the class described, comprising: a plate; an elongated arcuate anchor post mounted on and projected upwardly from said plate; a clamping band, one end of said band being doubled upon itself to provide a loop for looping over said anchor post and anchoring, one end of said plate having an opening formed therein; a nut-forming member having a threaded opening formed therethrough; a reduced portion on said nut forming member projecting through said opening in said plate and upset for mounting said nut forming member to said plate in swivel relation thereto; a screw threaded through said nut forming member; a fitting swivelly mounted on one end of said screw; and a pair of spaced arcuate arms on said fitting adapted for embracing an eyelet formed on the free end of said band and detachably connecting to the free end of said band.

LOUIS FIEDLER.